United States Patent
Lu et al.

(10) Patent No.: US 12,191,940 B2
(45) Date of Patent: Jan. 7, 2025

(54) USER MATCHING AND POWER DISTRIBUTION METHODS FOR MIMO-NOMA DOWNLINK COMMUNICATION SYSTEM

(71) Applicant: NANJING UNIVERSITY OF POSTS AND TELECOMMUNICATIONS, Jiangsu (CN)

(72) Inventors: Yin Lu, Jiangsu (CN); Yihuang Qu, Jiangsu (CN); Chuying Yang, Jiangsu (CN); Taosen Li, Jiangsu (CN); Xiumei Wang, Jiangsu (CN); Hongbo Zhu, Jiangsu (CN)

(73) Assignee: NANJING UNIVERSITY OF POSTS AND TELECOMMUNICATIONS (CN)

( * ) Notice: Subject to any disclaimer, the term of this patent is extended or adjusted under 35 U.S.C. 154(b) by 334 days.

(21) Appl. No.: 17/789,634

(22) PCT Filed: Feb. 21, 2020

(86) PCT No.: PCT/CN2020/076142
§ 371 (c)(1),
(2) Date: Jun. 28, 2022

(87) PCT Pub. No.: WO2021/159551
PCT Pub. Date: Aug. 19, 2021

(65) Prior Publication Data
US 2023/0041216 A1 Feb. 9, 2023

(30) Foreign Application Priority Data
Feb. 12, 2020 (CN) .......................... 202010087725.4

(51) Int. Cl.
*H04B 7/0426* (2017.01)
*H04L 25/03* (2006.01)

(52) U.S. Cl.
CPC ..... *H04B 7/0426* (2013.01); *H04L 25/03331* (2013.01)

(58) Field of Classification Search
None
See application file for complete search history.

(56) References Cited

U.S. PATENT DOCUMENTS

| | | | |
|---|---|---|---|
| 2015/0057041 A1* | 2/2015 | Bao | H04W 8/005 455/515 |
| 2018/0234867 A1* | 8/2018 | Wang | H04W 72/0473 |
| 2021/0212114 A1* | 7/2021 | Chen | H04W 74/0816 |

FOREIGN PATENT DOCUMENTS

| | | | | |
|---|---|---|---|---|
| CN | 108430040 A | * | 8/2018 | ............ H04W 4/08 |
| CN | 109617583 A | * | 4/2019 | ........... H04B 7/0408 |

\* cited by examiner

*Primary Examiner* — Srinivasa R Reddivalam

(57) ABSTRACT

A user matching and power distribution methods for a MIMO-NOMA downlink communication system is provided. The user matching method includes: dividing all users into a strong user group and a weak user group according to a channel gain sorting result; and sequentially selecting a user in the strong user group, calculating a correlation coefficient between the user and each user in the weak user group, selecting a weak user with the highest correlation coefficient as a weak user in a cluster where the strong user is located, and excluding matched users from respective user groups, until the matching between all strong users and weak users are completed. The present invention enables weak users in a cluster to experience less inter-cluster interference in scenarios where the channel correlation between users is relatively low, thereby improving the total throughput of the communication system.

7 Claims, 6 Drawing Sheets

USER MATCHING AND POWER DISTRIBUTION METHODS FOR MIMO-NOMA DOWNLINK COMMUNICATION SYSTEM

FIELD

The present invention relates to the technical field of communications, and in particular, to user matching and power distribution methods for MIMO-NOMA downlink communication system.

BACKGROUND

With the rapid development of communication technology, the mobile data traffic is increasing exponentially, and it is expected that by 2020, the data traffic may increase by at least 1,000 times compared with 2010. In the face of the scarcity of spectrum resources, new technologies are urgently needed to improve the capacity of communication systems. As one of the key technologies of 5G, Non-Orthogonal Multiple Access (NOMA) may make better use of the system's spectrum resources and improve the system's total throughput compared with the Orthogonal Multiple Access (OMA) technology of 4G.

The NOMA distinguishes signals by using the difference of signal power, and a channel is changed from the exclusive use of a single signal to the superposition and multiplexing of multiple signals. At a receiving end, an interference signal in superimposed signals is eliminated by the Successive Interference Cancellation (SIC) technology. Researches show that the greater the difference in channel gain of the superimposed signals of users at a transmitting end is, the easier the demodulation at the receiving end is, and the more obvious the improvement of the system throughput is. To further improve the system throughput, the NOMA may be combined with the Multiple-Input Multiple-Output (MIMO) technology. Several antennas are deployed at a base station, and each antenna transmits and receives signals independently. By using the characteristics of Space Division Multiple Access (SDMA), each antenna is distributed to a different independent channel according to the space, to realize simultaneous interference-free transmission of multiple signals on the same frequency. The MIMO technology may exponentially increase the throughput of the system by increasing the spectrum utilization rate while keeping the total transmit power of the system unchanged. In conclusion, combining NOMA with MIMO may further improve the performance of the system.

Different from the conventional MIMO or NOMA, users in the MIMO-NOMA downlink communication system may not only be interfered by other users in a cluster (hereinafter referred to as "intra-cluster interference"), but also by users in other cluster (hereinafter referred to as "inter-cluster interference"). In the prior art, a Zero Forcing (ZDF) precoding matrix is generated by using a channel gain matrix of users with stronger channel gain in each cluster (hereinafter referred to as "strong user") to eliminate the inter-cluster interference of the strong user. However, when users are matched, scenarios with higher channel correlation between users are often selected, and the channel difference between users is the primary goal, which leads to a sharp decrease in the rate of weak users in scenarios with lower channel correlation between users as the number of users increases. Although some technologies consider the Quality of Service (QoS) of users in a cluster, the matching process of users is ignored and lacks further research.

SUMMARY

The technical problems to be solved by the present invention are to overcome the defect that the current user matching method easily causes the performance of the entire communication system to degrade in a scenario where a channel correlation between users is relatively low, and to provide user matching and power distribution methods for a MIMO-NOMA downlink communication system.

To solve the foregoing technical problems, the present invention adopts the following technical solutions.

Provided is a user matching method for a MIMO-NOMA downlink communication system, including the following steps:

sorting respective channel gains of users, if a total number of the users is not an even number, directly excluding a user with the lowest channel gain to exclusively share a channel, and equally dividing all the users into a strong user group and a weak user group according to a channel gain sorting result, where a group with a larger channel gain is the strong user group, and a group with a smaller channel gain is the weak user group; and sequentially selecting a user in the strong user group, and calculating a correlation coefficient between the user and each user in the weak user group, if the correlation coefficient is greater than or equal to a preset threshold, selecting a weak user with the highest correlation coefficient as a weak user in a cluster where the strong user is located, and excluding matched users from respective user groups, until the matching between all strong users and weak users are completed.

Furthermore, an expression for calculating the correlation coefficient between users is as follows:

$$\gamma_{i,j} = \frac{Cov(h_i, h_j)}{\sqrt{D(h_i)} \sqrt{D(h_j)}},$$

where $h_i$ and $h_j$ are channel gain vectors of an $i^{th}$ user and a $j^{th}$ user, respectively, $Cov(h_i, h_j)$ is a covariance of $h_i$ and $h_j$, and $D(h_i)$ and $D(h_j)$ are variances of $h_i$ and $h_j$, respectively.

Furthermore, if the correlation coefficients of all matching combinations are less than the preset threshold, the matching of the cluster where the users of the selected strong user group is located is skipped; and after the matching process is completed, the remaining users of the weak user group are sequentially selected as weak users of an unmatched cluster.

Another objective of the present invention is to solve the technical problem that the prior art aims at maximizing the system throughput during power distribution, but does not consider the QoS of strong users and weak users in the cluster at the same time, causing that the fairness of users in the cluster cannot be guaranteed on the basis of ensuring that the user correlation between clusters is as high as possible.

To realize the foregoing technical objective, on the other hand, the present invention provides a power distribution method for a MIMO-NOMA downlink communication system, including:

sorting respective channel gains of users, if a total number of the users is not an even number, directly excluding a user with the lowest channel gain to exclusively share a channel, and equally dividing all the users into a strong user group and a weak user group according to a channel gain sorting result, where a group with a larger channel gain is the strong user group, and a group with a smaller channel gain is the weak user group;

sequentially selecting a user in the strong user group, and calculating a correlation coefficient between the user and each user in the weak user group, if the correlation coefficient is greater than or equal to a preset threshold, selecting a weak user with the highest correlation coefficient as a weak user in a cluster where the strong user is located, and excluding matched users from respective user groups, until the matching between all strong users and weak users are completed; and distributing a preset transmit power to each cluster, and distributing a transmit power to strong users and weak users in the cluster, where a power distribution factor $\alpha_{n,1}$ of the strong users satisfies the following power distribution conditions:

$$\max_{\alpha_{n,1}}(R_{n,1} + R_{n,2})$$

$$\text{s.t. } R_{n,1} \geq R_{n_1,conv-BF}$$

$$R_{n,2} \geq R_{n_2,conv-BF}$$

$$0 \leq \alpha_{n,1} \leq 1,$$

where $R_{n,1}$ is a data rate of strong users in a cluster n, $R_{n,2}$ is a data rate of weak users in the cluster n; $R_{n_1,conv-BF}$ is a rate threshold of strong users in a MIMO-OMA system under the same conditions, and $R_{n_2,conv-BF}$ is a rate threshold of weak users in the MIMO-OMA system under the same conditions.

Furthermore, an objective function is established by using a Lagrange multiplier method and the power distribution factor is solved by using a KKT condition, where an expression of the objective function is as follows:

$$L(\alpha_{n,1},\mu,\gamma) = -f(\alpha_{n,1}) + \mu g(\alpha_{n,1}) + \gamma h(\alpha_{n,1}),$$

where $\mu$ and $\gamma$ are introduction parameters, $$\begin{cases} f(\alpha_{n,1}) = R_{n,1} + R_{n,2} \\ g(\alpha_{n,1}) = R_{n_1,conv-BF} - R_{n,1} \\ h(\alpha_{n,1}) = R_{n_2,conv-BF} - R_{n,2} \end{cases}.$$

Furthermore, a method for determining the power distribution factor is as follows: when $\mu$ is greater than 0 and $\gamma$ is equal to 0, making $R_{n,1}$ equal to $R_{n_1,conv-BF}$, an equation for calculating the power distribution factor being as follows:

$$\alpha_{n,2} = \frac{\sqrt{1+|h_{n,1}|^2\beta} - 1}{|h_{n,1}|^2\beta}, \text{ where } \beta = \frac{P}{\sigma_0^2},$$

$\sigma_0^2$ is a variance of additive white Gaussian noise, P is a preset power of the cluster, and $h_{n,1}$ is a channel gain vector of strong users in the cluster n; and when $\mu$ is equal to 0 and $\gamma$ is greater than 0, making $R_{n,2}$ equal to $R_{n_2,conv-BF}$, the equation for calculating the power distribution factor being as follows:

$$\alpha_{n,1} = \frac{\varphi P + 1 - \sqrt{1+|h_{n,1}|^2\beta}}{\varphi P \sqrt{1+|h_{n,2}|^2\beta}},$$

where $h_{n,2}$ is a channel gain vector of weak users in the cluster n, $\varphi$ is a normalized channel gain, and an expression is as follows:

$$\varphi = \frac{|h_{n,2}m_n|^2}{\sum_{i=1,i\neq n}^{N}|h_{n,2}m_i|^2 P + \sigma_0^2},$$

where $m_n$ is a precoding vector of the cluster n, $m_i$ is a precoding vector of a cluster i, and N is the total number of clusters.

Furthermore, an expression for calculating the correlation coefficient between users is as follows:

$$\gamma_{i,j} = \frac{Cov(h_i, h_j)}{\sqrt{D(h_i)}\sqrt{D(h_j)}},$$

where $h_i$ and $h_j$ are channel gain vectors of an $i^{th}$ user and a $j^{th}$ user, respectively, $Cov(h_i,h_j)$ is a covariance of $h_i$ and $h_j$, and $D(h_i)$ and $D(h_j)$ are variances of $h_i$ and $h_j$, respectively.

Furthermore, if the correlation coefficients of all matching combinations are less than the preset threshold, the matching of the cluster where the users of the selected strong user group is located is skipped; and after the matching process is completed, the remaining users of the weak user group are sequentially selected as weak users of an unmatched cluster.

The present invention has the following advantageous effects:

The user matching method provided by the present invention enables weak users in a cluster to suffer less inter-cluster interference than the conventional MIMO-NOMA solution in a scenario with lower inter-user channel correlation, thereby improving the total throughput (performance) of the communication system. The number of searches of the user matching method is also significantly lower than that of the conventional MIMO-NOMA solution, and the advantages may be more obvious when the number of users increases.

The power distribution method provided by the present invention has lower computational complexity, and guarantees the lowest rate (fairness) of the users in the cluster while maximizing the total throughput of the communication system.

DETAILED DESCRIPTION

The present invention is further descried below in combination with the accompanying drawings. The following embodiments are merely used for more clearly describing the technical solutions of the present invention, but are not intended to limit the scope of protection of the present invention.

Figure 1:
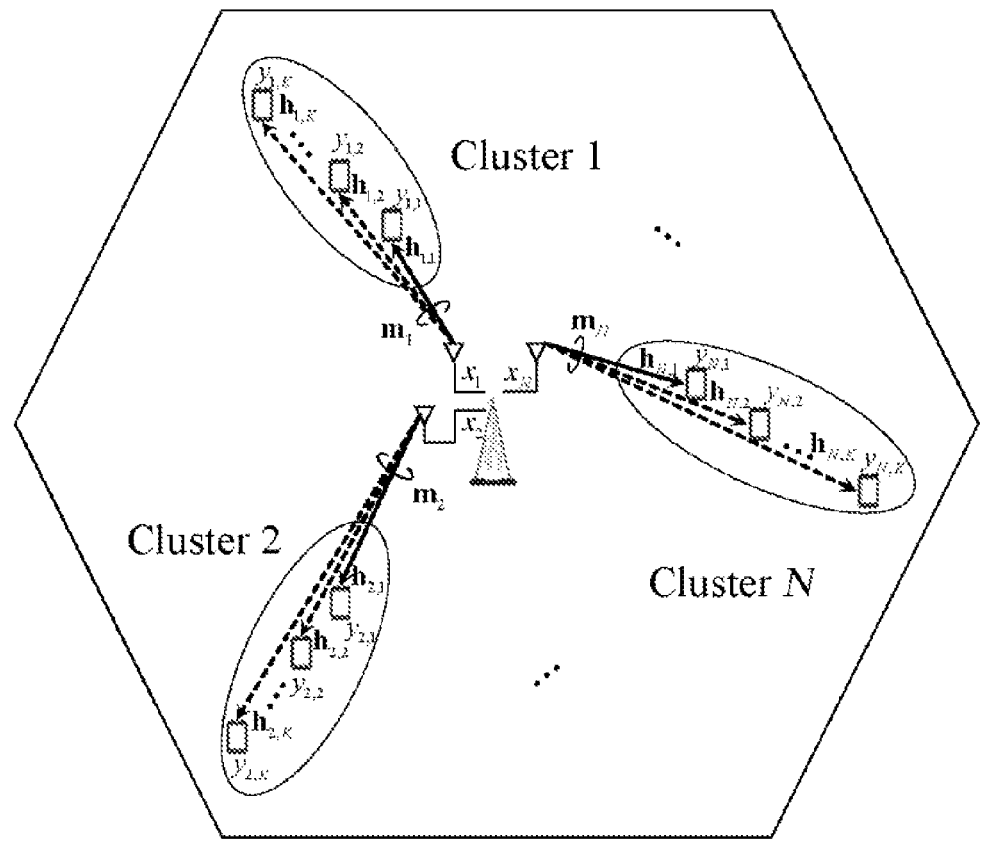
FIG. 1 is a MIMO-NOMA downlink communication system model of a specific embodiment of the present invention.

A single-cell MIMO-NOMA downlink communication system model is as shown in FIG. 1. The cell center is a Base Station (BS), and the base station is deployed with $N_r$ antennas. It is assumed that users in the cell are divided into N clusters, and when $N=N_r$, each Beam Forming (BF) vector matches one separate cluster. Under normal conditions, a total number of antennas of the users is greater than a total number of antennas of the base station. It is assumed that each user in the cell is equipped with one antenna, and the total number of receiving antennas of the users is L. It is assumed that each cluster has K users, and the entire cellular system contains $$\sum_{n=1}^{N} K = L$$

users (receiving antennas).

For the convenience of discussion, it is assumed that the number of clusters in the cell is equal to the number of antennas of the base station, that is, $N=N_r$.

A received signal of a user k in a cluster n is $$y_{n,k} = h_{n,k} m_n x_n + h_{p,k} \sum_{i=1, i \neq n}^{N} m_i x_i + N_{n,k} \quad (1)$$

$$= h_{n,k} m_n \sqrt{P_{n,k}} s_{n,k} + h_{n,k} m_n \sum_{j=1, j \neq k}^{K} \sqrt{P_{n,j}} s_{n,j} + h_{n,k} \sum_{i=1, i \neq n}^{N} m_i x_i + N_{n,k}$$

where $\gamma_{n,k}$ represents the received signal of a user $k(k \in \{1, 2, \ldots, K\})$ in a cluster $n(n \in \{1, 2, \ldots, N\})$ and $s_{n,k}$ represents that a signal $$h_{n,k} = g_{n,k} d_{n,k}^{-\frac{a}{2}}$$

sent by the base station to the user is a channel gain vector of the user, where $g_{n,k}$ represents a Rayleigh fading channel vector from the base station to the user, $d_{n,k}$ represents a distance from the base station to the user, and α is a path loss index. $P_{n,k}$ represents a transmit power distributed by the base station to the user, and satisfies $$P_T = \sum_{n=1}^{N} \sum_{k=1}^{K} P_{n,k},$$

where $P_T$ is a restricted total power. $m_n$ represents a precoding vector corresponding to a cluster n, $N_{n,k}$ is the additive white Gaussian noise with a variance $\sigma_n^2$; and $x_i$ represents a superimposed signal on an antenna $i(i \in \{1, 2, \ldots, N\})$, and satisfies $$x_i = \sum_{j=1}^{K} \sqrt{P_{i,j}} s_{i,j},$$

where $s_{i,j}$ is a signal of a user $j(j \in \{1, 2, \ldots, K\})$ in the superimposed signal.

In the MIMO-NOMA downlink communication system, the users in the cluster interfere with each other due to the superposition of the signals, and thus the SIC technology is used for demodulation. A signal demodulation model when there are only two users in the cluster is discussed below, where a user $k_1$ is a user with a stronger channel gain, and a user $k_2$ is a user with a weaker channel gain.

Figure 2:
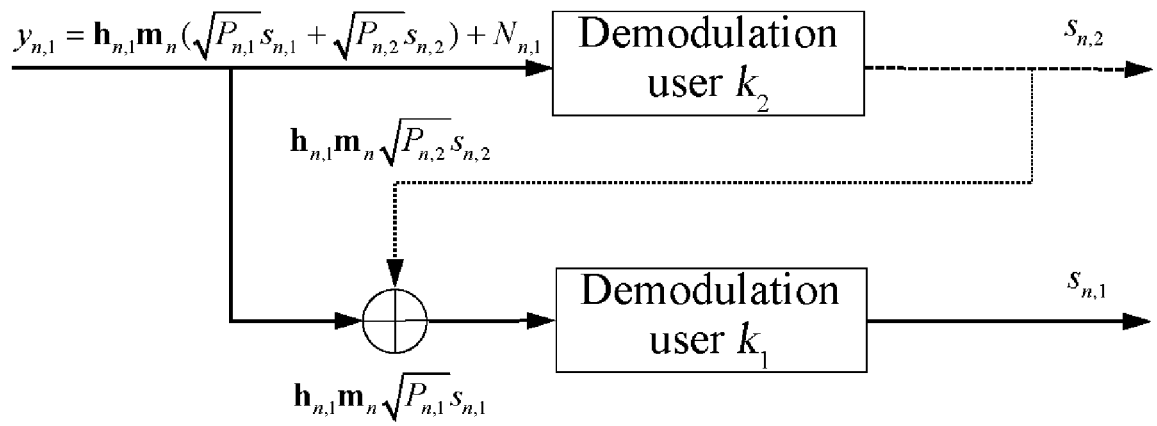
FIG. 2 is a demodulation process of a user $k_1$ in the MIMO-NOMA downlink communication system model.
Figure 3:
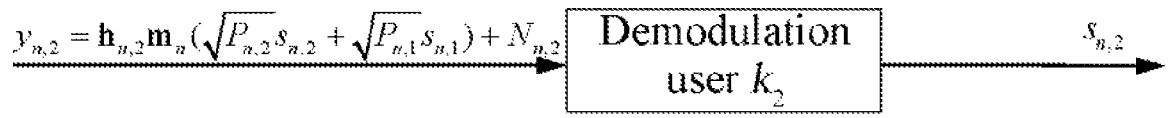
FIG. 3 is a demodulation process of a user $k_2$ in the MIMO-NOMA downlink communication system model.

After estimating and reconstructing a signal of the user $k_2$, the user $k_1$ performs SIC to eliminate a signal of $k_2$ from the superimposed signal and demodulate an own signal, as shown in FIG. 2. The user $k_2$ may filter the signal of the user $k_1$ as noise interference and directly demodulate its own signal, as shown in FIG. 3.

It is still applicable to extend the signal demodulation model of the above two users to the case of multiple users. It is assumed that $k_{max}$ users $(k_{max} \in \{1, 2, \ldots, K\})$ are multiplexed in the cluster n, and these users are sorted in a descending order of channel gains, that is, $|h_{n,1}|^2 \geq |h_{n,2}|^2 \geq |h_{n,3}|^2 \geq \ldots \geq |h_{n,k-max}|^2$. After SIC demodulation, the received signal of the user k in the cluster n is:

$$y_{n,k} = \underbrace{h_{n,k} m_n \sqrt{P_{n,k}} s_{n,k}}_{\text{Useful signal}} + \underbrace{h_{n,k} m_n \sum_{j=1}^{k-1} \sqrt{P_{n,j}} s_{n,j}}_{\text{Intra-cluster interference}} + \underbrace{h_{n,k} \sum_{i=1, i \neq n}^{N} m_i x_i}_{\text{Inter-cluster interference}} + \underbrace{N_{n,k}}_{\text{Additive noise}} \quad (2)$$

It is assumed that $E[|s_{i,j}|^2]=1(\forall i,j)$ a Signal to Interference plus Noise Ratio (SINR) of the user k in the cluster n is $$SINR_{n,k} = \frac{|h_{n,k} m_n|^2 P_{n,k}}{|h_{n,k} m_n|^2 \sum_{j=1}^{k-1} P_{n,1} + \sum_{i=1, i \neq n}^{N} |h_{n,k} m_i|^2 P_i + \sigma_n^2} \quad (3)$$

$$= \frac{\varphi_{n,k} P_{n,k}}{\varphi_{n,k} \sum_{j=1}^{k-1} P_{n,j} + 1}$$

where $P_i$ is a total transmission power of a cluster i, and $\varphi_{n,k}$ is a normalized channel gain, defined as follows:

$$\varphi_{n,k} = \frac{|h_{n,k}m_n|^2}{\sum_{i=1,i\neq n}^{N} |h_{n,k}m_i|^2 P_i + \sigma_n^2} \quad (4)$$

According to the Shannon equation, an throughput of the user is derived as:

$$R_{n,k} = B\log_2(1 + SINR_{n,k}) = B\log_2\left(1 + \frac{\varphi_{n,k}P_{n,k}}{\varphi_{n,k}\sum_{j=1}^{k-1}P_{n,j} + 1}\right) \quad (5)$$

where B is a total bandwidth of the system.
The total throughput of the system is:

$$R_{total} = \sum_{n=1}^{N}\sum_{k=1}^{K} R_{n,k} \quad (6)$$

According to related documents, if there are more than two NOMA users in a multiplexing cluster, although the performance of the system may be improved, it may bring a lot of interference to users in the cluster, and it is difficult to achieve signal demodulation in practical scenarios. Therefore, user matching and power distribution may then be performed on the basis of two users per cluster. First, ZF precoding is performed on a transmit signal to eliminate inter-cluster interference to strong users; then, intra-cluster interference is reduced by means of reasonable user matching; and finally, the throughput of the system is maximized while ensuring the minimum rate of users by using a KKT condition.

ZF precoding and signal processing:
a ZF precoding vector is generated by the channel gain vector of the strong user in each cluster, and the ZF precoding vector $m_n$ of the cluster n satisfies the following condition:

$$\frac{h_{m,1}}{|h_{m,1}|}m_n = \begin{cases} 0 & m \neq n \\ 1 & m = n \end{cases} \quad (7)$$

where $h_{m,1}$ is a channel gain vector of strong users in a cluster m.

Equation (7) shows that if the ZF precoding vector of the cluster is orthogonal to a channel gain vectors of all strong users that are not in the cluster, it is equivalent to eliminating the inter-cluster interference to the strong users. However, users with weaker channel gain in the cluster (hereinafter referred to as "weak users") do not satisfy Equation (7), and still suffer from inter-cluster interference. A channel gain matrix is formed by using the channel gain vectors of the strong users in each cluster:

$$H = [h_{1,1}{}^T h_{2,1}{}^T \ldots h_{N,1}{}^T]^T \quad (8)$$

where $(\cdot)^T$ represents a transpose of the matrix.

A ZF precoding matrix M may be directly derived from H:

$$M = [m_1 \; m_2 \; \ldots \; m_N] \quad (9)$$
$$= (H)^+ = (H)^H((H)(H)^H)^{-1}$$

where $(\cdot)^+$ represents a generalized inverse of the matrix, $(\cdot)^H$ represents a conjugate transpose of the matrix, and $(\cdot)^{-1}$ represents an inverse matrix of the matrix.

It can be deduced from Equation (2) that the received signal of the strong user after SIC demodulation is:

$$y_{n,1} = \underbrace{h_{n,1}m_n\sqrt{P_{n,1}}s_{n,1}}_{\text{Useful signal}} + \underbrace{h_{n,1}\sum_{i=1,i\neq n}^{N}m_i x_i}_{\text{Inter-cluster interference}} + N_{n,1} \quad (10)$$

The weak user does not require SIC, and thus the received signal of the weak user is:

$$y_{n,2} = \underbrace{h_{n,2}m_n\sqrt{P_{n,2}}s_{n,2}}_{\text{Useful signal}} + \underbrace{h_{n,2}m_n\sqrt{P_{n,1}}s_{n,1}}_{\text{Intra-cluster interference}} + \underbrace{h_{n,2}\sum_{i=1,i\neq n}^{N}m_i x_i}_{\text{Inter-cluster interference}} + N_{n,2} \quad (11)$$

The ZF precoding vector $m_n$ is generated according to Equation (8) and Equation (9), and is substituted into Equation (7) to obtain $h_{n,1}m_n = |h_{n,1}|$ and $h_{n,1}m_i = 0$ (i≠n), respectively. In this case, the inter-cluster interference of strong users is eliminated:

$$y_{n,1} = |h_{n,1}|\sqrt{\alpha_{n,1}P_n}s_{n,1} + N_{n,1} \quad (12)$$

where $\alpha_{n,i}$ (i=1,2) is a power distribution factor, $\alpha_{n,1}$ is a power distribution factor of the strong user, and $P_n$ is a total power of the cluster n.

A channel gain vector $h_{n,2}$ of the weak user does not satisfy Equation (7), and thus there is still inter-cluster interference:

$$y_{n,2} = h_{n,2}m_n\sqrt{\alpha_{n,2}P_n}s_{n,2} + \underbrace{h_{n,2}m_n\sqrt{\alpha_{n,1}P_n}s_{n,1}}_{\text{Intra-cluster interference}} + \underbrace{h_{n,2}\sum_{i=1,i\neq n}^{N}m_i x_i}_{\text{Inter-cluster interference}} + N_{n,2} \quad 13)$$

where $\alpha_{n,2}$ is a power distribution factor of weak user.
Similarly, the SINR and throughput of the two users are derived according to the Shannon equation:

$$R_{n,1} = B\log_2(1 + SINR_{n,1}) = B\log_2\left(1 + \frac{|h_{n,1}|^2\alpha_{n,1}P_n}{\sigma_n^2}\right) \quad (14\text{-a})$$

$$R_{n,2} = B\log_2(1 + SINR_{n,2}) = \quad (14\text{-b})$$
$$B\log_2\left(1 + \frac{|h_{n,2}m_n|^2\alpha_{n,2}P_n}{|h_{n,2}m_n|^2\alpha_{n,1}P_n + \sum_{j=1,i\neq n}^{N}|h_{n,2}m_i|^2 P_i + \sigma_n^2}\right)$$
$$= B\log_2\left(1 + \frac{\varphi_{n,2}\alpha_{n,2}P_n}{\varphi_{n,2}\alpha_{n,1}P_n + 1}\right)$$

-continued where $\varphi_{n,2} = \dfrac{|h_{n,2}m_n|^2}{\sum\limits_{i=1, i\neq n}^{N} |h_{n,2}m_i|^2 P_i + \sigma_n^2}$.

User matching needs to comprehensively consider the channel gain of the users and the channel correlation between the users.

Equation (12) and Equation (13) show that the inter-cluster interference and intra-cluster interference suffered by strong users in a cluster may be eliminated by using the ZF precoding matrix and the SIC technology, respectively. However, weak users in the cluster do not satisfy Equation (7) and do not require SIC, and thus still suffer from the inter-cluster interference and intra-cluster interference. Because the ZF precoding matrix is generated according to the channel gain matrix of the strong users in the cluster, if a channel of the weak users in the cluster is more similar to a channel of the strong users, that is, the greater the channel correlation between the weak users and the strong users is, the less the inter-cluster interference for the weak user is. Although a larger channel gain difference may reduce some of the intra-cluster interferences to the weak users, in a scenario where the channel correlation between the users is relatively low, as the number of users increases, the inter-cluster interference for the weak users is much greater than the intra-cluster interference. Therefore, if the channel correlation between the weak user and the strong user is greater, the total interference received by the weak user is less.

In conclusion, the user matching needs to consider the channel correlation between users first, and then consider the channel gain difference.

An embodiment provides a user matching method for a MIMO-NOMA downlink communication system, including: sorting respective channel gains of users, if a total number of the users is not an even number, directly excluding a user with the lowest channel gain to exclusively share a channel, and equally dividing all the users into a strong user group and a weak user group according to a channel gain sorting result, where a group with a larger channel gain is the strong user group, and a group with a smaller channel gain is the weak user group; and sequentially selecting a user in the strong user group, and calculating a correlation coefficient between the user and each user in the weak user group, if the correlation coefficient is greater than or equal to a preset threshold, selecting a weak user with the highest correlation coefficient as a weak user in a cluster where the strong user is located, and excluding matched users from respective user groups, until the matching between all strong users and weak users are completed.

Figure 9:
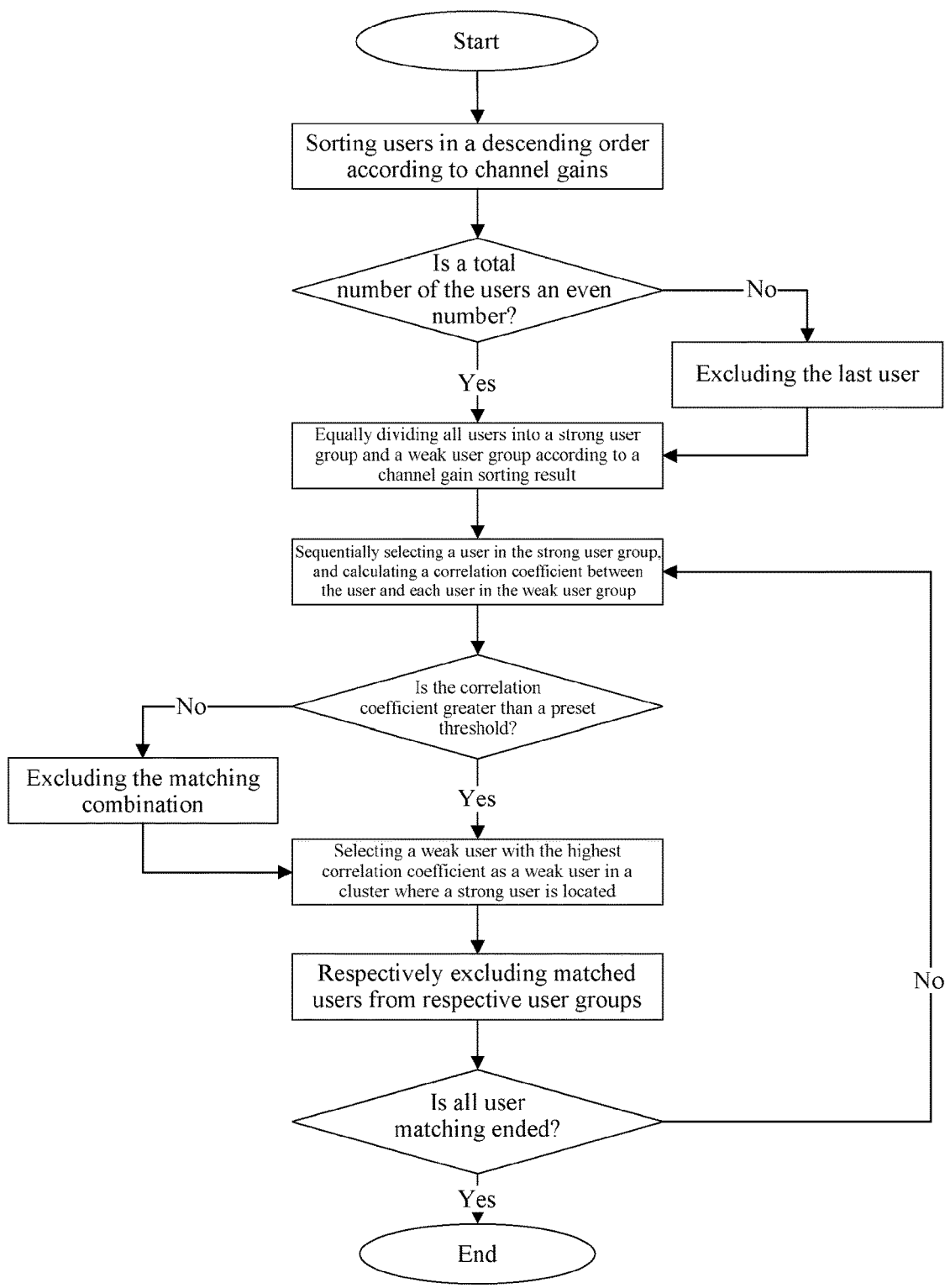
FIG. 9 is a schematic flowchart of a user matching method provided by a specific embodiment of the present invention.

The specific matching method of the embodiment is as follows (the flowchart is as shown in FIG. 9).

Step 1: users are sorted in a descending order according to own channel gains, and if a total number of the users is not an even number, a user with the lowest channel gain are directly excluded to exclusively share a channel, that is, $|h_1|^2 \geq |h_2|^2 \geq |h_3|^2 \geq \ldots \geq |h_L|^2 (L=2N)$. The first N users are taken as strong users of each cluster, and the remaining users are weak users, waiting to be matched with the strong users.

Sets $U_{strong}$ and $U_{weak}$ are defined to store the strong users and the weak users, respectively.

Step 2: a correlation coefficient between a user i and a user j is $$\gamma_{i,j} = \dfrac{\operatorname{Cov}(h_i, h_j)}{\sqrt{D(h_i)} \sqrt{D(h_j)}},$$

where $\operatorname{Cov}(h_i,h_j)$ is a covariance of $h_i$ and $h_j$, and $D(h_i)$ and $D(h_j)$ are variances of $h_i$ and $h_j$, respectively. $\delta$ is defined as a channel correlation threshold of the user i and the user j.

Step 3: a first user in the set $U_{strong}$ is taken as a strong user of a cluster 1, and users in the set $U_{weak}$ are traversed to match the strong users, respectively. The correlation coefficient is calculated for all matching combinations. If the correlation coefficient is less than $\delta$, the matching combination is excluded. If all matching combinations are excluded, the user matching of the cluster is skipped. In all the matching combinations that are greater than or equal to the threshold, the weak user in the matching combination with the largest correlation coefficient is the weak user of the cluster 1. So far, the cluster 1 completes user matching, excludes the matched strong users and weak users from $U_{strong}$ and $U_{weak}$ respectively, and the above steps are repeated until the cluster N completes the matching.

Step 4: the remaining users are matched. Since all the users have been sorted in a descending order according to the channel gains, it is only needed to sequentially extract the users from the set $U_{weak}$ to match the strong users.

The user matching method provided by the present invention enables weak users in a cluster to suffer less inter-cluster interference than the conventional MIMO-NOMA solution in a scenario with lower inter-user channel correlation, thereby improving the total throughput (performance) of the communication system. The number of searches of the user matching method is also significantly lower than that of the conventional MIMO-NOMA solution, and the advantages may be more obvious when the number of users increases.

Another embodiment provides a power distribution method for a MIMO-NOMA downlink communication system. The power distribution method performs power distribution on the basis of implementing system clustering and intra-cluster users in the foregoing embodiment, and includes the following steps:

sorting respective channel gains of users, if a total number of the users is not an even number, directly excluding a user with the lowest channel gain to exclusively share a channel, and equally dividing all the users into a strong user group and a weak user group according to a channel gain sorting result, where a group with a larger channel gain is the strong user group, and a group with a smaller channel gain is the weak user group;

sequentially selecting a user in the strong user group, and calculating a correlation coefficient between the user and each user in the weak user group, if the correlation coefficient is greater than or equal to a preset threshold, selecting a weak user with the highest correlation coefficient as a weak user in a cluster where the strong user is located, and excluding matched users from respective user groups, until the matching between all strong users and weak users are completed; and distributing a preset transmit power to each cluster, and distributing a transmit power to strong users and weak users in the cluster, where a power distribution factor $\alpha_{n,1}$ of the strong users satisfies the following power distribution conditions:

$$\max_{\alpha_{n,1}} (R_{n,1} + R_{n,2}) \tag{15}$$

-continued s.t. $R_{n,1} \geq R_{n_1,conv-BF}$ $R_{n,2} \geq R_{n_2,conv-BF}$ $0 \leq \alpha_{n,1} \leq 1$ where $R_{n,1}$ is a data rate of strong users in a cluster n, $R_{n,2}$ is a data rate of weak users in the cluster n; $R_{n_1,conv-BF}$ is a rate threshold of strong users in a MIMO-OMA system under the same conditions, and $R_{n_2,conv-BF}$ is a rate threshold of weak users in the MIMO-OMA system under the same conditions.

The specific implementation method is as follows: it is assumed that the transmit power distributed by each cluster is equal, that is, $P_n = P$.

Different powers are distributed to the users in the cluster to facilitate differentiation during demodulation, and thus the power distribution factor is the focus of power distribution.

By comprehensively considering three factors, i.e., the complexity of solving the power distribution factor, the QoS of the user, and the system throughput, the power distribution method proposed by the present invention is as follows.

The power distribution factor $\alpha_{n,1}$ of the strong user necessarily satisfies the following conditions:

$$\max_{\alpha_{n,1}}(R_{n,1} + R_{n,2}) \quad (16\text{-a})$$

s.t. $R_{n,1} \geq R_{n_1,conv-BF}$ (16-b)

$R_{n,2} \geq R_{n_2,conv-BF}$ (16-c)

$0 \leq \alpha_{n,1} \leq 1$. (16-d)

In the conventional MIMO-OMA downlink communication system, if the base station has one antenna, two time slots are required to support two users.

However, in the MIMO-NOMA downlink communication system discussed in the present invention, since user signals are superimposed in a power domain, one antenna can support two users in one time slot, and thus under the same conditions, the MIMO-OMA user rate is:

$$R_{n_1,conv-BF} = \frac{1}{2}\log_2\left(1 + \frac{|h_{n,i}|^2 P}{\sigma_n^2}\right), i = 1, 2 \quad (17)$$

Equation (16) is a convex optimization problem containing inequality constraints, and the present invention adopts KKT conditions to solve it. First, an objective function is established by using the Lagrange multiplier method:

$$L(\alpha_{n,1},\mu,\gamma) = -f(\alpha_{n,1}) + \mu g(\alpha_{n,1}) + \gamma h(\alpha_{n,1}) \quad (18)$$

where $\mu$ and $\gamma$ are introduction parameters, $$\begin{cases} f(\alpha_{n,1}) = R_{n,1} + R_{n,2} \\ g(\alpha_{n,1}) = R_{n_1,conv-BF} - R_{n,1} \\ h(\alpha_{n,1}) = R_{n_2,conv-BF} - R_{n,2} \end{cases} \quad (19)$$

The KKT condition is established according to Equation (18):

$$\frac{\partial L(\alpha_{n,1},\mu,\gamma)}{\partial \alpha_{n,1}} = \frac{\partial f(\alpha_{n,1})}{\partial \alpha_{n,1}} + \mu \frac{\partial g(\alpha_{n,1})}{\partial \alpha_{n,1}} + \gamma \frac{\partial h(\alpha_{n,1})}{\partial \alpha_{n,1}} = 0 \quad (20\text{-a})$$

$$\mu g(\alpha_{n,1}) = 0 \quad (20\text{-b})$$

$$\gamma h(\alpha_{n,1}) = 0 \quad (20\text{-c})$$

$$g(\alpha_{n,1}) \leq 0 \quad (20\text{-d})$$

$$h(\alpha_{n,1}) \leq 0 \quad (20\text{-e})$$

$$\mu, \gamma \geq 0 \quad (20\text{-f})$$

To simplify the calculation result, the variance of the additive white Gaussian noise is $\sigma_0^2$, and $\varphi_{n,2}$ and $\alpha_{n,2}$ in Equation (14) are replaced with $\varphi$ and $1-\alpha_{n,1}$, respectively. A partial differential equation of Equation (20-a) is solved to obtain $\alpha_{n,1}$, $$\alpha_{n,1} = \frac{1}{(\gamma-\mu)}\left[\frac{(\mu+1)|h_{n,1}|^2\beta - (\gamma+1)\varphi P}{P|h_{n,1}|^2\varphi\beta}\right] \quad (21)$$

where $\beta = \frac{P}{\sigma_0^2}$, and $\varphi = \frac{|h_{n,2}m_n|^2}{\sum_{i=1,i\neq n}^{N}|h_{n,2}m_i|^2 P + \sigma_0^2}$.

Equation (21) has serious limitations because when $\gamma-\mu \to 0$, $\alpha_{n,1} \to \infty$. However, $\alpha_{n,1}$ necessarily satisfies Equation (16-d), so Equation (20) should be discussed in categories.

Case 1: when $\mu>0$ and $\gamma>0$, according to Equations (20-b) and (20-c), $g(\alpha_{n,1})=0$ and $h(\alpha_{n,1})=0$ are established simultaneously. $\alpha_{n,1}$ solved by the two equations are not equal, and thus this condition is not established.

Case 2: when $\mu=\gamma=0$, a denominator of Equation (21) is 0, and this condition is not established, either.

Case 3: when $\mu>0$ and $\gamma=0$, $\alpha_{n,1}^{(1)}$ is derived from Equation (20-b):

$$\alpha_{n,1}^{(1)} = \frac{\sqrt{1+|h_{n,1}|^2\beta}-1}{|h_{n,1}|^2\beta} \quad (22)$$

Case 4: when $\mu=0$ and $\gamma>0$, $\alpha_{n,1}^{(2)}$ is derived from Equation (20-c):

$$\alpha_{n,1}^{(2)} = \frac{\varphi P + 1 - \sqrt{1+|h_{n,2}|^2\beta}}{\varphi P\sqrt{1+|h_{n,2}|^2\beta}} \quad (23)$$

Equations (22) and (23) show that, under the constraint of the lowest rate, in order to satisfy $R_{n,1} \geq R_{n_1,conv-BF}$ ($R_{n,2} \geq R_{n_2,conv-BF}$), $\alpha_{n,1}$ necessarily satisfies $\alpha_{n,1} \geq \alpha_{n,1}^{(1)}$ ($\alpha_{n,1} \leq \alpha_{n,1}^{(2)}$). The optimal solution $\alpha_{n,1}^{(1)}$ ($\alpha_{n,1}^{(2)}$) may always ensure that the rate of strong users (weak users) is greater than or equal to the minimum rate, $R_{n_1,conv-BF}$ ($R_{n_2,conv-BF}$), which ensures the minimum rate of users.

Two power distribution methods may be obtained from Equations (22) and formula (23).

Method 1: if the rate of the strong user is considered first, $R_{n,1}=R_{n_1,conv-BF}$, and the power distribution factor $\alpha_{n,1}^{(1)}$ is calculated according to Equation (22). $\alpha_{n,1}=\alpha_{n,1}^{(1)}$, and $\alpha_{n,2}=\alpha_{n,1}^{(1)}$, which are substituted into Equation (14) to calculate $R_{n,1}$ and $R_{n,2}$.

Method 2: if the rate of the weak user is considered first, $R_{n,2}=R_{n_2,conv-BF}$, and the power distribution factor $\alpha_{n,1}^{(2)}$ is calculated according to Equation (23). $\alpha_{n,1}=\alpha_{n,1}^{(2)}$, and $\alpha_{n,2}=1-\alpha_{n,1}^{(2)}$ which are substituted into Equation (14) to calculate $R_{n,1}$ and $R_{n,2}$.

The power distribution method provided by the present invention has lower computational complexity, and guarantees the lowest rate (fairness) of the users in the cluster while maximizing the total throughput of the communication system.

The simulation results are given below:

The proposed solution is simulated by using MATLAB. The channel model adopts a Rayleigh fading channel, each cluster is multiplexed with two users, and each user is configured with one antenna. The specific simulation parameters are as shown in Table 1.

TABLE 1

System simulation parameters

| Parameters | Numerical values |
| --- | --- |
| Total bandwidth B/MHz | 4.32 |
| Cell radius d/m | 500 |
| Transmit power P/dBm | 0~30 |
| Additive noise spectral density $N_{n,k}$/dBm | −174 |
| Rayleigh fading channel vector $g_{n,k}$ | ~CN(0, 1) |
| Path loss index α | 3 |

Figure 4:
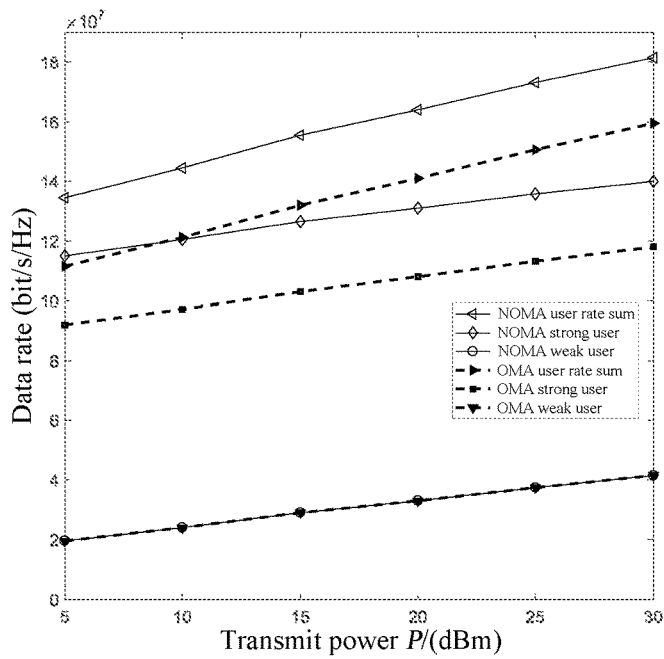
FIG. 4 is a simulation rate comparison result of a power distribution method provided by a specific embodiment of the present invention and a conventional MIMO-OMA solution when $R_{n,2}=R_{n_2,conv-BF}$.

Analysis of the Simulation Result:

The MIMO-NOMA solution proposed in the present invention is simulated and compared with the MIMO-OMA under the same conditions. As shown in FIG. 4, when $R_{n,2}=R_{n_2,conv-BF}$, the rate of the NOMA weak user is guaranteed to be equal to the rate of the OMA weak user under the same conditions, and the remaining power is distributed to the NOMA strong user. In this case, the rate of the NOMA strong user is significantly higher than that of the OMA strong user, and the sum rate of the NOMA user is also higher than that of the OMA user, indicating that the proposed solution is valid.

Figure 5:
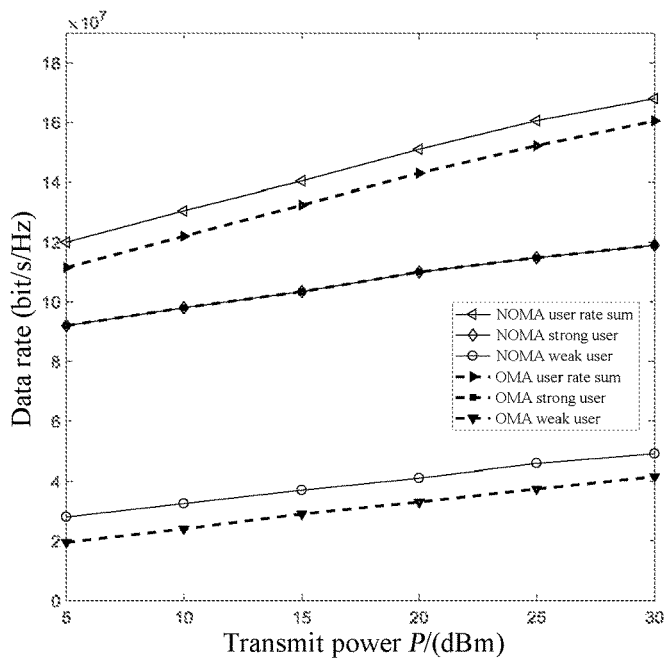
FIG. 5 is a simulation rate comparison result of a power distribution method provided by a specific embodiment of the present invention and a conventional MIMO-OMA solution when $R_{n,1}=R_{n_1,conv-BF}$.

As shown in FIG. 5, when $R_{n,1}=R_{n_1,conv-BF}$, the rate of the NOMA strong user is guaranteed to be equal to the rate of the OMA strong user under the same conditions, and the remaining power is distributed to the NOMA weak user. In this case, the rate of the NOMA weak user is significantly higher than that of the OMA weak user, and the sum rate of the NOMA user is also higher than that of the OMA user, indicating that the proposed solution is valid. The sum rate of the NOMA user in FIG. 5 is lower than that of the NOMA user in FIG. 4. This is because the system distributes more power to weak users. Although the rate of the weak user is increased, the throughput improvement to the overall system is relatively small. In actual communication scenarios, the two distribution methods should be used according to specific situations. For cell edge users, the QoS should be guaranteed first to improve fairness.

To verify the superiority of the proposed solution of the present invention, the solution of the present invention is simulated and compared with the conventional MIMO-NOMA solution. In the conventional MIMO-NOMA solution, when users are matched, all users are traversed to perform one-to-one matching. A channel gain gap is calculated for the matching combinations that satisfy the preset correlation requirements separately, that is, $d(i,j)=||h_i|-|h_j||$, and the calculated d(i,j) is compared. The matching combination with the largest d(i,j) is a target matching combination, so as to determine a cluster and users in the cluster. The conventional MIMO-NOMA solution is suitable for scenarios with higher channel correlation between the users. It can be known from the previous analysis that in a scenario with higher channel correlation between the users, the channels of the weak users are similar to those of the strong users. Because the ZF precoding matrix is generated according to the channel gain matrix of the strong users, the weak users in the conventional MIMO-NOMA solution suffer relatively less inter-cluster interference. Although the conventional MIMO-NOMA solution focuses on the difference of channel gains among NOMA users during user matching, a scenario with lower channel correlation between the users is not considered. Therefore, the present invention takes the channel correlation ρ as 0.9 and 0.3 respectively for simulation comparison.

Figure 6:
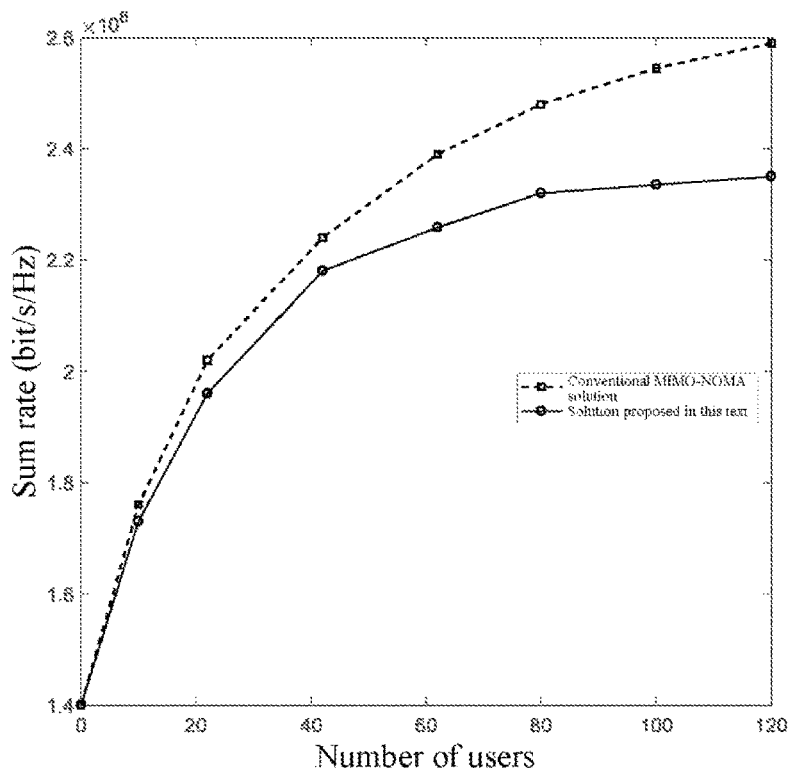
FIG. 6 is a sum rate comparison result of a user matching method provided by a specific embodiment of the present invention and a conventional MIMO-NOMA solution when $\rho=0.9$.
Figure 7:
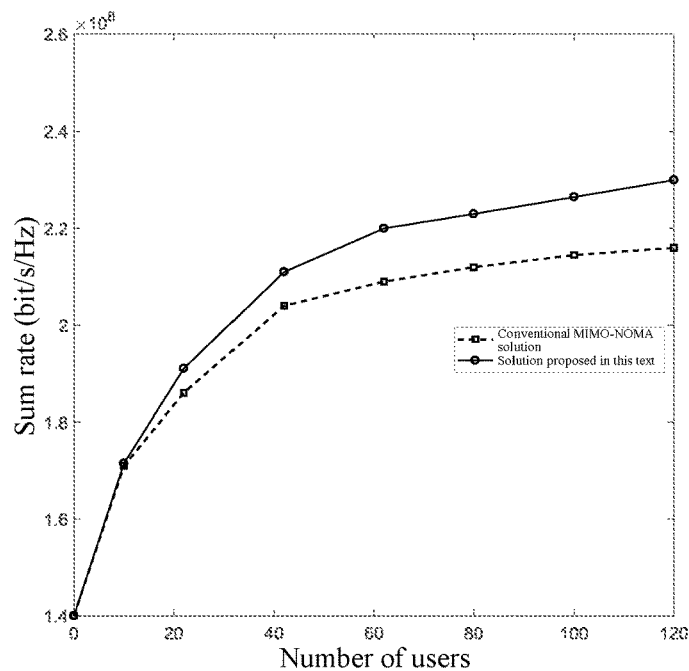
FIG. 7 is a sum rate comparison result of a user matching method provided by a specific embodiment of the present invention and a conventional MIMO-NOMA solution when ρ=0.3.

As shown in FIG. 6, when ρ=0.9 (the channel correlation between the users is relatively high), the system and rate of the conventional MIMO-NOMA solution are higher than those proposed by the present invention, because the user matching process is based on the premise that the interference between clusters is relatively small. As shown in FIG. 7, when ρ=0.3 (the channel correlation between the users is relatively low), the sum rate of the solution proposed by the present invention is higher than that of the conventional MIMO-NOMA solution, because the present invention gives priority to the channel correlation between the users. Under this condition, the user matching method of the conventional MIMO-NOMA solution may bring larger inter-cluster interference to the weak users.

Figure 8:
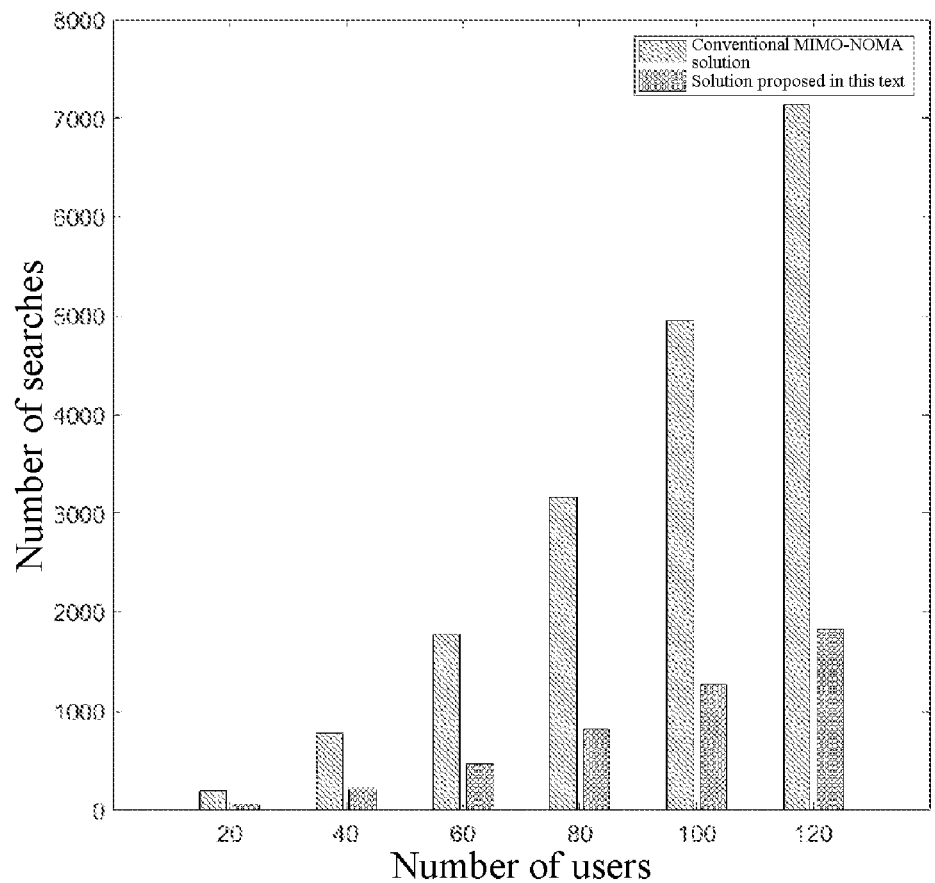
FIG. 8 is a comparison of the number of searches between a user matching method provided by a specific embodiment of the present invention and a conventional MIMO-NOMA solution.

It is found through comparison of the number of searches of the user matching method of the present invention with the conventional MIMO-NOMA solution that the complexity of the user matching of the present invention is relatively low. The conventional MIMO-NOMA solution traverses all users during user matching, and sets the number of users to be L and the number of searches to be L(L−1)/2. In the present invention, users are divided into halves go fifty-fifty and then traversed, and the number of searches is $(L^2+2L)/8$. As shown in FIG. 8, the number of searches of the solution proposed by the present invention is significantly lower than that of the conventional MIMO-NOMA solution, and when the number of users increases, the advantage may also be more obvious.

The present invention proposes user matching and power distribution methods for the MIMO-NOMA downlink communication system based on the scenario with lower channel correlation between users, and solves the power distribution factor by using the KKT condition, thereby realizing the goal of maximizing the system throughput while ensuring the minimum communication rate (fairness) of the users. The simulation result shows that the throughput of the proposed solution is higher than that of the MIMO-OMA downlink communication system under the same conditions, and the complexity and system performance of the proposed solution are better than those of the conventional method in the scenario with lower channel correlation between users.

Those skilled in the art should understand that embodiments of the present application can be provided as methods, systems, or computer program products. Accordingly, the present application may take the form of a hardware embodiment, a complete software embodiment, or a combination of embodiments in respect of software and hardware. Moreover, the present application may take the form of a computer program product implemented on one or more computer available storage media (including but not limited to a disk memory, a CD-ROM, an optical memory, etc.) including computer available program codes.

What is claimed is:

1. A user matching method for a MIMO-NOMA downlink communication system, comprising the following steps:

sorting respective channel gains of users, if a total number of the users is not an even number, directly excluding a user with the lowest channel gain to exclusively share a channel, and equally dividing all the users into a strong user group and a weak user group according to a channel gain sorting result, wherein a group with a larger channel gain is the strong user group, and a group with a smaller channel gain is the weak user group; and sequentially selecting a user in the strong user group, and calculating a correlation coefficient between the user and each user in the weak user group, if the correlation coefficient is greater than or equal to a preset threshold, selecting a weak user with the highest correlation coefficient as a weak user in a cluster where the strong user is located, and excluding matched users from respective user groups, until the matching between all strong users and weak users are completed, if the correlation coefficients of all matching combinations are less than the preset threshold, the matching of the cluster where the users of the selected strong user group is located is skipped; and after the matching process is completed, the remaining users of the weak user group are sequentially selected as weak users of an unmatched cluster.

2. The user matching method for a MIMO-NOMA downlink communication system according to claim 1, wherein an expression for calculating the correlation coefficient between users is as follows:

$$\gamma_{i,j} = \frac{Cov(h_i, h_j)}{\sqrt{D(h_i)} \sqrt{D(h_j)}}$$

wherein $h_i$ and $h_j$ are channel gain vectors of an $i^{th}$ user and a $j^{th}$ user, respectively, $Cov(h_i,h_j)$ is a covariance of $h_i$ and $h_j$, and $D(h_i)$ and $D(h_j)$ are variances of $h_i$ and $h_j$, respectively.

3. A power distribution method for a MIMO-NOMA downlink communication system, comprising:

sorting respective channel gains of users, if a total number of the users is not an even number, directly excluding a user with the lowest channel gain to exclusively share a channel, and equally dividing all the users into a strong user group and a weak user group according to a channel gain sorting result, wherein a group with a larger channel gain is the strong user group, and a group with a smaller channel gain is the weak user group;

sequentially selecting a user in the strong user group, and calculating a correlation coefficient between the user and each user in the weak user group, if the correlation coefficient is greater than or equal to a preset threshold, selecting a weak user with the highest correlation coefficient as a weak user in a cluster where the strong user is located, and excluding matched users from respective user groups, until the matching between all strong users and weak users are completed; and distributing a preset transmit power to each cluster, and distributing a transmit power to strong users and weak users in the cluster, wherein a power distribution factor $\alpha_{n,1}$ of the strong users satisfies the following power distribution conditions:

$$\max_{\alpha_{n,1}} (R_{n,1} + R_{n,2})$$

$$\text{s.t.} \quad R_{n,1} \geq R_{n_1,conv-BF}$$

$$R_{n,2} \geq R_{n_2,conv-BF}$$

$$0 \leq \alpha_{n,1} \leq 1,$$

wherein $R_{n,1}$ is a data rate of strong users in a cluster n, $R_{n,2}$ is a data rate of weak users in the cluster n; $R_{n_1,conv-BF}$ is a rate threshold of strong users in a MIMO-OMA system under the same conditions, and $R_{n_2,conv-BF}$ is a rate threshold of weak users in the MIMO-OMA system under the same conditions.

4. The power distribution method for a MIMO-NOMA downlink communication system according to claim 3, wherein an objective function is established by using a Lagrange multiplier method, and the power distribution factor is solved by using a KKT condition, wherein an expression of the objective function is as follows:

$$L(\alpha_{n,1},\mu,\gamma) = -f(\alpha_{n,1}) + \mu g(\alpha_{n,1}) + \gamma h(\alpha_{n,1}),$$

where $\mu$ and $\gamma$ are introduction parameters, $$\begin{cases} f(\alpha_{n,1}) = R_{n,1} + R_{n,2} \\ g(\alpha_{n,1}) = R_{n_1,conv-BF} - R_{n,1} \\ h(\alpha_{n,1}) = R_{n_2,conv-BF} - R_{n,2} \end{cases}.$$

5. The power distribution method for a MIMO-NOMA downlink communication system according to claim 4, wherein a method for determining the power distribution factor is as follows:

when $\mu$ is greater than 0 and $\gamma$ is equal to 0, making $R_{n,1}$ equal to $R_{n_1,conv-BF}$, an equation for calculating the power distribution factor being as follows:

$$\alpha_{n,1} = \frac{\sqrt{1 + |h_{n,1}|^2 \beta} - 1}{|h_{n,1}|^2 \beta},$$

wherein $\beta = \dfrac{P}{\sigma_0^2}$, is a variance of additive white Gaussian noise, P is a preset power of the cluster, and $h_{n,1}$ is a channel gain vector of strong users in the cluster n; and when $\mu$ is equal to 0 and $\gamma$ is greater than 0, making $R_{n,2}$ equal to $R_{n_2,conv-BF}$, the equation for calculating the power distribution factor being as follows:

$$\alpha_{n,1} = \frac{\varphi P + 1 - \sqrt{1 + |h_{n,2}|^2 \beta}}{\varphi P \sqrt{1 + |h_{n,2}|^2 \beta}},$$

wherein $h_{n,2}$ is a channel gain vector of weak users in the cluster n, $\varphi$ is a normalized channel gain, and an expression is as follows:

$$\varphi = \frac{|h_{n,2}m_n|^2}{\sum_{i=1, i \neq n}^{N} |h_{n,2}m_i|^2 P + \sigma_0^2},$$

wherein $m_n$ is a precoding vector of the cluster n, $m_i$ is a precoding vector of a cluster i, and N is the total number of clusters.

6. The power distribution method for a MIMO-NOMA downlink communication system according to claim 3, wherein an expression for calculating the correlation coefficient between users is as follows:

$$\gamma_{i,j} = \frac{Cov(h_i, h_j)}{\sqrt{D(h_i)}\sqrt{D(h_j)}},$$

wherein $h_i$ and $h_j$ are channel gain vectors of an $i^{th}$ user and a $j^{th}$ user, respectively, $Cov(h_i,h_j)$ is a covariance of $h_i$ and $h_j$, and $D(h_i)$ and $D(h_j)$ are variances of $h_i$ and $h_j$, respectively.

7. The power distribution method for a MIMO-NOMA downlink communication system according to claim 3, wherein if the correlation coefficients of all matching combinations are less than the preset threshold, the matching of the cluster where the users of the selected strong user group is located is skipped; and after the matching process is completed, the remaining users of the weak user group are sequentially selected as weak users of an unmatched cluster.

* * * * *